US009219624B2

(12) United States Patent
Gao et al.

(10) Patent No.: US 9,219,624 B2
(45) Date of Patent: Dec. 22, 2015

(54) METHOD AND DEVICE FOR REPORTING ANTENNA CALIBRATION INFORMATION AND DETERMINING ANTENNA CALIBRATION FACTOR

(75) Inventors: Qiubin Gao, Beijing (CN); Shaohui Sun, Beijing (CN); Deshan Miao, Beijing (CN); Fei Qin, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 582 days.

(21) Appl. No.: 13/638,224

(22) PCT Filed: Apr. 19, 2011

(86) PCT No.: PCT/CN2011/072984
§ 371 (c)(1),
(2), (4) Date: Sep. 28, 2012

(87) PCT Pub. No.: WO2011/131117
PCT Pub. Date: Oct. 27, 2011

(65) Prior Publication Data
US 2013/0034010 A1 Feb. 7, 2013

(30) Foreign Application Priority Data
Apr. 19, 2010 (CN) .......................... 2010 1 0153539

(51) Int. Cl.
*H04L 1/02* (2006.01)
*H04B 7/02* (2006.01)
(Continued)

(52) U.S. Cl.
CPC ............ *H04L 25/0224* (2013.01); *H04B 17/12* (2015.01); *H04B 17/21* (2015.01);
(Continued)

(58) Field of Classification Search
CPC ..... H04L 1/0618; H04L 1/06; H04L 27/2647; H04B 7/0417; H04B 7/0669; H04B 7/0845; H04B 1/30
See application file for complete search history.

(56) References Cited

U.S. PATENT DOCUMENTS

2005/0085236 A1* 4/2005 Gerlach et al. ................ 455/450
2007/0099573 A1 5/2007 Naguib et al.
(Continued)

FOREIGN PATENT DOCUMENTS

CN 1672376 9/2005
CN 101291503 10/2008
(Continued)

OTHER PUBLICATIONS

Nishimori et al., "A New Calibration Method of Adaptive Array for TDD Systems", Nippon Telegraph and Telephone Corporation, Japan; Jul. 11, 1999.
International Search Report for PCT/CN2011/072984 dated Jul. 28, 2011.

*Primary Examiner* — Ted Wang
(74) *Attorney, Agent, or Firm* — Foley & Lardner LLP (57) ABSTRACT

A method and device for reporting antenna calibration information and determining antenna calibration factor are provided by the present invention. When reporting the antenna calibration information, a user equipment (UE) estimates the downlink equivalent baseband channel from a plurality of antennas of the base station to the UE; according to the equivalent baseband channel, determines the amplitude response and delay value to be reported, and then reports the amplitude response and delay value to the base station. When determining the antenna calibration factor, according to the uplink signal sent by the UE on the base station-directed time-frequency resources, the base station determines the amplitude response and the delay value; according to the amplitude response and delay value reported by the UE and according to the amplitude response and delay value determined by the uplink signal, the base station calculates the antenna calibration factor. Because the UE pre-processing process is added, the sensitivity degrees to the channel estimation error and to the channel Doppler extension are reduced.

18 Claims, 2 Drawing Sheets

(51) Int. Cl.
  *H04L 25/02* (2006.01)
  *H04L 5/00* (2006.01)
  *H04B 17/12* (2015.01)
  *H04B 17/21* (2015.01)
  *H04W 72/04* (2009.01)
  *H04W 72/08* (2009.01)
  *H04B 7/06* (2006.01)
  *H04B 17/24* (2015.01)

(52) U.S. Cl.
  CPC ........... *H04L 5/0023* (2013.01); *H04L 5/0057* (2013.01); *H04L 25/0204* (2013.01); *H04B 7/0626* (2013.01); *H04B 17/24* (2015.01); *H04W 72/0406* (2013.01); *H04W 72/085* (2013.01)

(56) References Cited

U.S. PATENT DOCUMENTS

2007/0121552 A1\* 5/2007 Lindoff .................. 370/333
2009/0093222 A1 4/2009 Sarkar
2011/0150049 A1\* 6/2011 Dent ....................... 375/219

FOREIGN PATENT DOCUMENTS

| CN | 101351978 | 1/2009 |
| WO | WO-03/028248 A1 | 4/2003 |
| WO | WO-2008/146494 | 12/2008 |
| WO | WO-2008/156389 A1 | 12/2008 |
| WO | WO-2009/046318 | 4/2009 |

\* cited by examiner

METHOD AND DEVICE FOR REPORTING ANTENNA CALIBRATION INFORMATION AND DETERMINING ANTENNA CALIBRATION FACTOR

The present application is a US National Stage of International Application No. PCT/CN2011/072984, filed 19 Apr. 2011, designating the United States, and claiming priority to Chinese Patent Application No. 201010153539.2, filed with the State Intellectual Property Office of China on Apr. 19, 2010 and entitled "Method and device for reporting antenna calibration information and determining antenna calibration factor", all of which are hereby incorporated by reference in their entirety.

FIELD OF THE INVENTION

The present invention relates to the field of radio communications and particularly to a method and device for reporting antenna calibration information and determining an antenna calibration factor.

BACKGROUND OF THE INVENTION

A Multiple-Input Multiple-Output (MIMO) system refers to a system with a plurality of antennas equipped at both a transmitter and a receiver. A process in the space field is introduced to the MIMO system in addition to traditional processes in the time and frequency domains to thereby further obtain an array process gain and a diversity gain. In the MIMO system, the transmitter can optimize a transmission signal according to a channel characteristic if it can obtain channel information somehow to thereby improve a reception quality and lower required complexity of the receiver. Linear pre-coding/beam-forming is such an optimization method as effective means to deal with a fading channel, to lower an error probability and to improve the performance of the system.

For multi-antenna linear pre-coding/beam-forming transmission, information of a channel from a base station to a User Equipment (UE) is an important factor influencing the performance of a system. In a Frequency Division Duplex (FDD) system, the UE feeds the estimated channel information back to the base station over an uplink channel, and this scheme occupies considerable resources of the uplink channel and may introduce a quantization error, etc. In a Time Division Duplex (TDD) system, uplink and downlink signals are transmitted over the same frequency band, and thus reciprocity of uplink and downlink channels holds. The so-called reciprocity refers to that an uplink channel is identical to a downlink channel. With the reciprocity of the uplink and downlink channels, the uplink channel can be estimated from the uplink signal transmitted from the UE to thereby obtain downlink channel information while dispensing with considerable feedback overhead.

Channel reciprocity holds to a spatially propagating physical channel. A signal will be fed to an antenna through a transmission circuit after being subjected to a baseband process, and a signal received from an antenna will also be fed to a baseband through a reception circuit. The transmission circuit refers to a circuit through which the signal goes from a baseband processing unit to an input port of the antenna, and the reception circuit refers to a circuit through which the signal goes from an output port of the antenna to the baseband processing unit. Generally the transmission circuit and the reception circuit are two different circuits, so the transmission circuit and the reception circuit introduce different delays and amplitude gains, in other words, the transmission and reception circuits are mismatched. Reciprocity of uplink and downlink channels may not exactly holds due to the mismatch of the transmission circuit and the reception circuit. Specifically, this is denoted as:

$$H_k^{DL}(f) = \alpha_k(f) e^{-j2\pi\Delta_k f} H_k^s(f) \eta(f) e^{-j2\pi\Omega f} \quad (1).$$

$H_k^{DL}(f)$ is an equivalent downlink baseband channel from the $k^{th}$ antenna of the base station to the antenna of the UE (given here only one reception antenna of the UE), which includes a spatially propagating channel $H_k^s(f)$, an amplitude response $\alpha_k(f)$ and a phase response $e^{-j2\pi\Delta_k f}$ of a transmission circuit of the $k^{th}$ antenna of the base station, and an amplitude response $\eta(f)$ and a phase response $e^{-j2\pi\Omega f}$ of a reception circuit of the antenna of the UE, where $\Delta_k$ and $\Omega$ are delays caused by the transmission circuit of the $k^{th}$ antenna of the base station and the reception circuit of the antenna of the UE respectively, and f is a frequency.

An equivalent uplink baseband channel from the antenna of the UE to the $k^{th}$ antenna of the base station is denoted as:

$$H_k^{UL}(f) = \beta_k(f) e^{-j2\pi\Pi_k f} H_k^s(f) \omega(f) e^{-j2\pi\Psi f} \quad (2).$$

It includes an amplitude response $\beta_k(f)$ and a phase response $e^{-j2\pi\Pi_k f}$ of a reception circuit of the $k^{th}$ antenna of the base station, and an amplitude response $\omega(f)$ and a phase response $e^{-j2\pi\Psi f}$ of a transmission circuit of the antenna of the UE, where $\Psi$ and $\Pi_k$ are delays caused by the transmission circuit of the antenna of the UE and the reception circuit of the $k^{th}$ antenna of the base station respectively.

As can be apparent from comparison of Equation (1) with Equation (2), the equivalent uplink baseband channel and the equivalent downlink baseband channel may differ from each other even with the same spatially propagating channel.

An equivalent uplink baseband channel from the antenna of the UE to a number M of antennas of the base station is written in the form of a vector as:

$$H^{UL}(f) = [H_1^{UL}(f), \ldots, H_M^{UL}(f)]$$
$$= \omega(f) e^{-j2\pi\Psi f} [H_1^s(f), \ldots, H_M^s(f)]$$
$$\begin{bmatrix} \beta_1(f)e^{-j2\pi\Pi_1 f} & 0 & 0 \\ 0 & \ddots & 0 \\ 0 & 0 & \beta_M(f)e^{-j2\pi\Pi_M f} \end{bmatrix}.$$

An equivalent downlink baseband channel from the M antennas of the base station to the antenna of the UE is written in the form of a vector as:

$$H^{DL}(f) = [H_1^{DL}(f), \ldots, H_M^{DL}(f)]$$
$$= \eta(f) e^{-j2\pi\Omega f} [H_1^s(f), \ldots, H_M^s(f)]$$
$$\begin{bmatrix} \alpha_1(f)e^{-j2\pi\Delta_1 f} & 0 & 0 \\ 0 & \ddots & 0 \\ 0 & 0 & \alpha_M(f)e^{-j2\pi\Delta_M f} \end{bmatrix}.$$

Given a downlink transmission scheme of Maximum Ratio Transmission (MRT), a downlink pre-coding vector (beam-forming weighting factor) is calculated from $H^{UL}(f)$ as:

$$w(f) = \frac{(H^{UL}(f))^H}{\|H^{UL}(f)\|};$$

where $(A)^H$ is a complex conjugate transpose of a vector A, and $\|A\|$ is the norm of the vector A.

A signal received by the UE is represented as:

$$r = H^{DL}(f)w(f)s(f) + n(f)$$

$$= H^{DL}(f)\frac{(H^{UL}(f))^H}{\|H^{UL}(f)\|}s(f) + n(f)$$

$$(\eta(f)e^{-j2\pi\Omega f}e^{-j2\pi\Psi f})$$

$$= \frac{\sum_{k=1}^{M}\alpha_k(f)e^{-j2\pi\Delta_k f}\beta_k(f)e^{j2\pi\Pi_1 f}|H_k^s(f)|^2}{\sqrt{\sum_{k=1}^{M}|\beta_k(f)|^2|H_k^s(f)|^2}}$$

$$s(f) + n(f);$$

where s(f) and n(f) are a data symbol transmitted to the UE and an additive noise respectively. If reciprocity of the uplink and downlink channels exactly holds, that is, $\alpha_k(f)=\beta_k(f)$ and $\Delta_k=\Pi_k$, w(f) is such that signals of the respective antennas received by the UE are superimposed in phase, and at this time the UE receives a signal with the highest signal to noise ratio. If the uplink and downlink circuits are mismatched and particularly have different delays, in-phase superimposition of the signals of the respective antennas cannot be ensured, thus lowering the signal to noise ratio of the received signal and deteriorating the performance.

A method for reducing the influence resulting from mismatched uplink and downlink circuits is to perform antenna calibration.

A calibration factor is calculated from information reported from the UE and/or information measured at the base station, and a channel estimated from an uplink signal is compensated and adjusted, or data to be transmitted is compensated and adjusted.

Two common antenna calibration schemes in the prior art will be introduced below.

Calibration Scheme 1:

1. The UE estimates delay values introduced by radio circuit lines and transmission filters (collectively referred below to as transmission circuits) of respective transmission antennas. The UE firstly estimates an equivalent downlink baseband channel from a transmission antenna to the UE at a specific frequency f, which includes a response of a transmission circuit, a spatially propagating channel and a response of a reception circuit. A phase of an equivalent downlink baseband channel from the $k^{th}$ transmission antenna to the UE is denoted as $\Theta_k(f)$ which can be represented as:

$$\Theta_k(f)=\phi_{h,k}(f)+2\pi\Delta_k f;$$

where the first term represents a phase of the equivalent downlink baseband channel of both the propagating channel and the response of the reception circuit of the UE, and $\Delta_k$ is a delay introduced by the transmission circuit of the $k^{th}$ transmission antenna of the base station. Without loss of generality, the UE can estimate the difference in time $\Delta_k-\Delta_1$ between the $k^{th}$ and $1^{st}$ antennas, particularly by linearly fitting $\Theta_k(f)-\Theta_1(f)$ so that the slope of a resulting straight line is $\Delta_k-\Delta_1$:

$$\Theta_k(f)-\Theta_1(f)=\phi_{h,k}(f)-\phi_{h,1}(f)+2\pi(\Delta_k-\Delta_1)f.$$

2. The UE quantizes and then feeds the obtained $\Delta_k-\Delta_1$ back to the base station.

3. The UE transmits a Sounding Reference Signal (SRS) or another uplink signal, and the base station estimates channels from the antenna of the UE to the respective reception antennas according to the SRS or the another uplink signal and estimates a delay $\Pi_k-\Pi_1$ introduced by the reception antenna circuit of the base station as in the step 1.

4. The base station compensates the uplink channel estimated by the base station according to $\Delta_k-\Delta_1$ reported from the UE and the estimated $\Pi_k-\Pi_1$. Given the uplink channel $H_k^{UL}(f)$ estimated by the base station, the estimated value of a compensated downlink channel is:

$$H_k^{DL}(f)=H_k^{UL}(f)e^{-j2\pi(\Delta_k-\Delta_1)f}e^{-j\pi(\Pi_k-\Pi_1)f}.$$

Calibration Scheme 2.

1. The UE firstly estimates an equivalent downlink baseband channel from a transmission antenna to the UE at a specific frequency f, which includes a response of a transmission circuit, a spatially propagating channel and a response of a reception circuit. An equivalent downlink baseband channel from the $k^{th}$ transmission antenna to the UE is denoted as $H_k^{DL}(f)$.

2. The UE quantizes and then feeds the obtained $H_k^{DL}(f)$ back to the base station.

3. The UE transmits an SRS or another uplink signal, and the base station estimates channels $H_k^{UL}(f)$ from the antenna of the UE to the respective reception antennas according to the SRS or the another uplink signal.

4. The base station calculates a calibration coefficient from $H_k^{DL}(f)$ reported from the UE and the estimated $H_k^{UL}(f)$:

$$c'_k=H_k^{DL}(f)/H_k^{UL}(f).$$

Without loss of generality, all the calibration coefficients can be normalized by the calibration coefficient of the antenna 1:

$$c_k=c'_k/c'_1.$$

5. The base station compensates the estimated uplink channel by the obtained calibration coefficient to obtain a downlink channel as:

$$H_k^{DL}(f)=H_k^{UL}(f)c_k.$$

Drawbacks of the prior art lie in as follows: the problem of the calibration scheme 1 lies in that only a phase error but no amplitude error can be calibrated, and an amplitude error may also have a serious influence on the performance; and the calibration scheme 2 can calibrate both a phase error and an amplitude error, but this scheme feeds a quantized equivalent downlink baseband channel back directly to the base station, and an estimation error and a quantization error of the equivalent downlink baseband channel may degrade the precision of calibration. Furthermore, if the UE has a channel varying with time, a spatially propagating channel measured at the UE may have varied from that measured at the base station, thus causing inaccurate calculation of a calibration coefficient.

SUMMARY OF THE INVENTION

A technical problem to be addressed by the invention is to provide a method for reporting antenna calibration information and a user equipment, and a method for determining an antenna calibration factor and a base station so as to address the problem of antenna calibration when reciprocity of uplink and downlink channels does not hold.

There is provided in an embodiment of the invention a method for reporting antenna calibration information, which includes the steps of:

estimating, by a UE, an equivalent downlink baseband channel from each of a plurality of antennas of a base station to the UE;

determining, by the UE, an amplitude response $\rho_k$ and a delay value $\Delta_k$ to be reported according to the equivalent baseband channel; and reporting, by the UE, $\rho_k$ and $\Delta_k$ to the base station.

There is provided in an embodiment of the invention a method for determining an antenna calibration factor, which includes the steps of:

receiving, by a base station, an uplink signal transmitted from a UE over a time and frequency resource specified by the base station;

estimating, by the base station, an equivalent uplink baseband channel from an antenna of the UE to each of reception antennas of the base station according to the uplink signal;

determining, by the base station, an amplitude response $\lambda_k$ and a delay value $\Pi_k$ according to the equivalent uplink baseband channel;

receiving, by the base station, $\rho_k$ and $\Delta_k$, determined according to the embodiment of the invention, reported from the UE; and calculating, by the base station, an antenna calibration factor according to $\mu_k$ and $\Pi_k$, and $\rho_k$ and $\Delta_k$.

There is provided in an embodiment of the invention a user equipment including:

an estimating module configured to estimate an equivalent downlink baseband channel from each of a plurality of antennas of a base station to the UE;

an amplitude response module configured to determine an amplitude response $\rho_k$ to be reported according to the equivalent baseband channel;

a delay module configured to determine a delay value $\Delta_k$ to be reported according to the equivalent baseband channel; and a reporting module configured to report $\rho_k$ and $\Delta_k$ to the base station.

There is provided in an embodiment of the invention a base station including:

an uplink signal receiving module configured to receive an uplink signal transmitted from a UE over a time and frequency resource specified by the base station;

an equivalent uplink baseband channel module configured to estimate an equivalent uplink baseband channel from an antenna of the UE to each of reception antennas of the base station according to the uplink signal;

an amplitude response module configured to determine an amplitude response $\lambda_k$ according to the equivalent uplink baseband channel;

a delay module configured to determine a delay value $\Pi_k$ according to the equivalent uplink baseband channel;

a receiving module configured to receive $\rho_k$ and $\Delta_k$ reported from the UE; and a calibration factor module configured to calculate an antenna calibration factor according to $\lambda_k$ and $\Pi_k$, and $\rho_k$ and $\Delta_k$.

Advantageous effects of the invention are as follows.

In a process of reporting antenna calibration information at the UE side, a UE estimates an equivalent downlink baseband channel from each of a plurality of antennas of a base station to the UE; and the UE determines an amplitude response $\rho_k$ and a delay value $\Delta_k$ according to the equivalent baseband channel and then reports $\rho_k$ and $\Delta_k$ to the base station.

In a process of determining an antenna calibration factor at the base station side, a base station determines an amplitude response $\lambda_k$ and a delay value $\Pi_k$ according to a received uplink signal; and then the base station calculates an antenna calibration factor according to $\rho_k$ and $\Delta_k$ reported from a UE, and $\lambda_k$ and $\Pi_k$.

Since the UE separates amplitude information and phase information out from channel information and feeds the information back to the base station, and the base station uses the information for calibration, thereby calibrating amplitude and phase concurrently. As can be apparent, the technical solution according to the invention can become less sensitive to a channel estimation error and channel Doppler spreading due to additional pre-processing by the UE.

DETAILED DESCRIPTION OF THE EMBODIMENTS

The multi-antenna technology has become a member of crucial technologies of a next-generation radio communication system, and linear pre-coding/beam-forming in the multi-antenna technology is an effective means to deal with a fading channel, to lower an error probability and to improve the performance of a system. With reciprocity of uplink and downlink channels, a TDD system can obtain information of a downlink channel from a base station to a UE according to information of an uplink channel, from the UE to the base station, estimated by the base station to thereby calculate a pre-coding matrix/a beam-forming weight. However, reciprocity of uplink and downlink channels may not exactly hold in a practical system, and a technical solution according to embodiments of the invention addresses the problem of antenna calibration when reciprocity of uplink and downlink channels does not hold. In the solution, amplitude information and phase information (a delay) are separated out from the downlink channel information estimated by the UE and fed back, and the base station uses the information for calibration. Particular embodiments of the invention will be described below with reference to the drawings.

The following description will be given respectively for implementations at the UE side and at the base station side, but this will not mean that both of them must cooperate for an implementation, and indeed, issues at the UE side and at the base station side can also be addressed respectively in the separate implementations at the UE and at the base station although a better technical effect can be achieved when both of them cooperate. A method for reporting antenna calibration information at the UE side and a method for determining an antenna calibration factor at the base station side will be described respectively.

Figure 1:
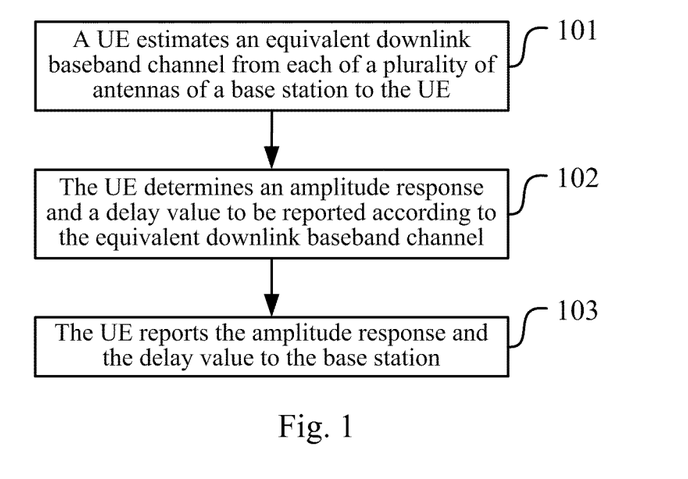
FIG. 1 is a schematic flow chart of a method for reporting antenna calibration information in an embodiment of the invention.

FIG. 1 is a schematic flow chart of a method for reporting antenna calibration information, and as illustrated in FIG. 1, a reporting process can include the following steps.

Step 101. A UE estimates an equivalent downlink baseband channel from each of a plurality of antennas of a base station to an antenna of the UE.

Step 102. The UE determines an amplitude response $\rho_k$ and a delay value $\Delta_k$ to be reported according to the equivalent downlink baseband channel.

In this step, the UE calculates $\rho_k$ and $\Delta_k$ according to the equivalent downlink baseband channel and can report the calculated $\rho_k$ and $\Delta_k$ only after quantizing them, so the calculated $\rho_k$ and $\Delta_k$ may not be totally the same as the reported $\rho_k$ and $\Delta_k$. A normal quantization process can be performed in an implementation.

In LTE and LTE-A systems, the UE estimates the equivalent downlink baseband channel from each of the plurality of antennas of the base station to the antenna of the UE using a reference signal which can be a Cell specific Reference Signal (CRS), a Channel State Information measurement Reference Signal (CSI-RS) or another well defined reference signal.

Step 103. The UE reports the $\rho_k$ and $\Delta_k$ the to the base station.

In an implementation, the UE can estimate the equivalent downlink baseband channel from each of a plurality of antennas of the base station to the antenna of the UE in the step 101 after the UE obtains an instruction of the base station.

Specifically, the base station can select and instruct a specific UE to participate in calibration and the specific UE performs measurements and a feedback required for calibration. The selected UE can be a UE with a good channel quality and at a low movement speed (e.g., a signal quality above a signal threshold and a movement speed below a movement threshold).

In an implementation, the UE estimates an equivalent downlink baseband channel from each of the plurality of antennas of the base station to an antenna of the UE in the step 101 can include:

the UE measures an equivalent downlink baseband channel from a transmission antenna at each of a number N of frequencies f in a frequency band specified by the base station to the antenna of the UE, which includes a response of a transmission circuit, a spatially propagating channel and a response of a reception circuit; and the UE determines $H_k^{DL}(f_i) = \alpha_k(f_i) H_k(f_i) e^{-j2\pi\Delta_k f_i}$, where $H_k^{DL}(f_i)$ is an equivalent downlink baseband channel from the $k^{th}$ transmission antenna at the $i^{th}$ frequency to the antenna of the UE, $H_k(f_i)$ is a synthesis channel including the response of the reception circuit of the antenna of the UE and the spatially propagating channel, $\alpha_k(f_i)$ is an amplitude response of the transmission circuit of the $k^{th}$ transmission antenna of the base station, and $e^{-j2\pi\Delta_k f_i}$ is a phase response of the transmission circuit of the $k^{th}$ transmission antenna of the base station.

Furthermore, in a Long Term Evolution (LTE) system, the specified frequency band can be several consecutive Physical Resource Blocks (PRBs) among which the frequencies f are sub-carriers.

In an implementation, the UE can determine $\Delta_k$ according to the equivalent downlink baseband channel in the step 102 as follows:

the UE measures an equivalent downlink baseband channel from a transmission antenna at each of a number N of frequencies f in a frequency band specified by the base station to an antenna of the UE, and the UE calculates $\Delta_k$ according to $H_k^{DL}(f_i)$ as follows:

phases of $H_k^{DL}(f_i)$ of the N frequencies are linearly fitted, and the slope of a straight line resulting from fitting divided by $2\pi$ is taken as an estimation value of $\Delta_k$: $\Theta_k(f_i) = \phi_{h,k}(f_i) + 2\pi\Delta_k f_i$ with i=1, 2, ... N, where $\phi_{h,k}(f_i)$ is a phase of $H_k(f_i)$, $\Theta_k(f_i)$ is a phase of $H_k^{DL}(f_i)$, $H_k^{DL}(f_i)$ is an equivalent downlink baseband channel from the $k^{th}$ transmission antenna at the $i^{th}$ frequency to the antenna of the UE, and $H_k(f_i)$ is a synthesis channel including the response of the reception circuit of the antenna of the UE and the spatially propagating channel; or the UE measures an equivalent downlink baseband channel from a transmission antenna at each of a number N of frequencies f in a frequency band specified by the base station to an antenna of the UE, linearly fits phases of $$\frac{H_k^{DL}(f_i)}{H_1^{DL}(f_i)}$$

the N frequencies taking the first antenna as a reference point, takes the slope of a straight line resulting from fitting divided by $2\pi$ as $\Delta_k - \Delta_1$, and takes $\Delta_k - \Delta_1$ as $\Delta_k$:
$\Theta_k(f_i) - \Theta_1(f_i) = \phi_{h,k}(f_i) - \phi_{h,1}(f_i) + 2\pi(\Delta_k - \Delta_1)f_i$, with i=1, 2, ... N, where $\phi_{h,k}(f_i)$ is a phase of $H_k(f_i)$, $\Theta_k(f_i)$ is a phase of $H_k^{DL}(f_i)$, $H_k^{DL}(f_i)$ is an equivalent downlink baseband channel from the $k^{th}$ transmission antenna at the $i^{th}$ frequency to the antenna of the UE, and $H_k(f_i)$ is a synthesis channel including the response of the reception circuit of the antenna of the UE and the spatially propagating channel.

Specifically, the UE can calculate $\Delta_k$ according to the measured $H_k^{DL}(f_i)$ by linearly fitting phases of $H_k^{DL}(f_i)$ at the N frequencies and taking the slope of a straight line resulting from fitting divided by $2\pi$ as an estimation value of $\Delta_k$ or deriving $\Delta_k - \Delta_1$ with the first antenna being a reference point in a similar way that $\Delta_k$ is estimated.

In an implementation, the UE can determine $\rho_k$ according to the equivalent downlink baseband channel in the step 102 as follows:

the UE measures an equivalent downlink baseband channel from a transmission antenna at each of a number N of frequencies f in a frequency band specified by the base station to an antenna of the UE, and the UE calculates $\rho_k$ according to $H_k^{DL}(f_i)$ as:

$$\rho_k = \frac{1}{N} \sum_{i=1}^{N} |H_k^{DL}(f_i)|,$$

where $H_k^{DL}(f_i)$ is an equivalent downlink baseband channel from the $k^{th}$ transmission antenna at the $i^{th}$ frequency to the antenna of the UE, or $$\rho_k = \sqrt{\frac{1}{N} \sum_{i=1}^{N} |H_k^{DL}(f_i)|^2},$$

where $H_k^{DL}(f_i)$ is an equivalent downlink baseband channel from the $k^{th}$ transmission antenna at the $i^{th}$ frequency to the antenna of the UE; or the UE measures an equivalent downlink baseband channel from a transmission antenna at each of a number N of frequencies f in a frequency band specified by the base station to an antenna of the UE, calculates an amplitude value of the $k^{th}$ antenna relative to the first antenna as $\rho'_k = \rho_k/\rho_1$ taking the first antenna as a reference antenna, where $$\rho_k = \frac{1}{N} \sum_{i=1}^{N} |H_k^{DL}(f_i)| \text{ or } \rho_k = \sqrt{\frac{1}{N} \sum_{i=1}^{N} |H_k^{DL}(f_i)|^2},$$

and $H_k^{DL}(f_i)$ is an equivalent downlink baseband channel from the $k^{th}$ transmission antenna at the $i^{th}$ frequency to the antenna of the UE, and then takes the derived $\rho'_k$ as $\rho_k$. Of course, only $\rho_k$ will be fed back in an implementation.

Specifically, when the UE calculates an amplitude response, since an amplitude response of a transmission circuit of an antenna of the base station in a specific range of frequencies is approximately constant, that is:

$$\alpha_k(f_1) \approx \alpha_k(f_2) \approx \ldots \approx \alpha_k(f_N),$$

thus $\rho_k$ can be calculated in the equation of:

$$\rho_k = \frac{1}{N} \sum_{i=1}^{N} |H_k^{DL}(f_i)| \approx \alpha_k(f_1) \frac{1}{N} \sum_{i=1}^{N} |H_k(f_i)|.$$

If the first antenna is taken as a reference antenna, an amplitude value of the $k^{th}$ antenna relative to the first antenna is $\rho'_k = \rho^k/\rho_1$, where $\rho_k$ can alternatively be calculated as:

$$\rho_k = \sqrt{\frac{1}{N} \sum_{i=1}^{N} |H_k^{DL}(f_i)|^2} \approx \alpha_k(f_1) \sqrt{\frac{1}{N} \sum_{i=1}^{N} |H_k(f_i)|^2}.$$

In an implementation, the UE reports $\rho_k$ and $\Delta_k - \Delta_1$ to the base station in the step 103, and the UE can feed the calculated $\Delta_k$ and $\rho_k$ back to the base station, where $\Delta_k$ can be replaced with $\Delta_k - \Delta_1$, and $\rho_k$ can be replaced with $\rho'_k$.

A number M of antennas of the base station can be antennas located at the same geographical location or antennas separate in geographical location or antennas controlled respectively by a plurality of base stations.

Figure 2:
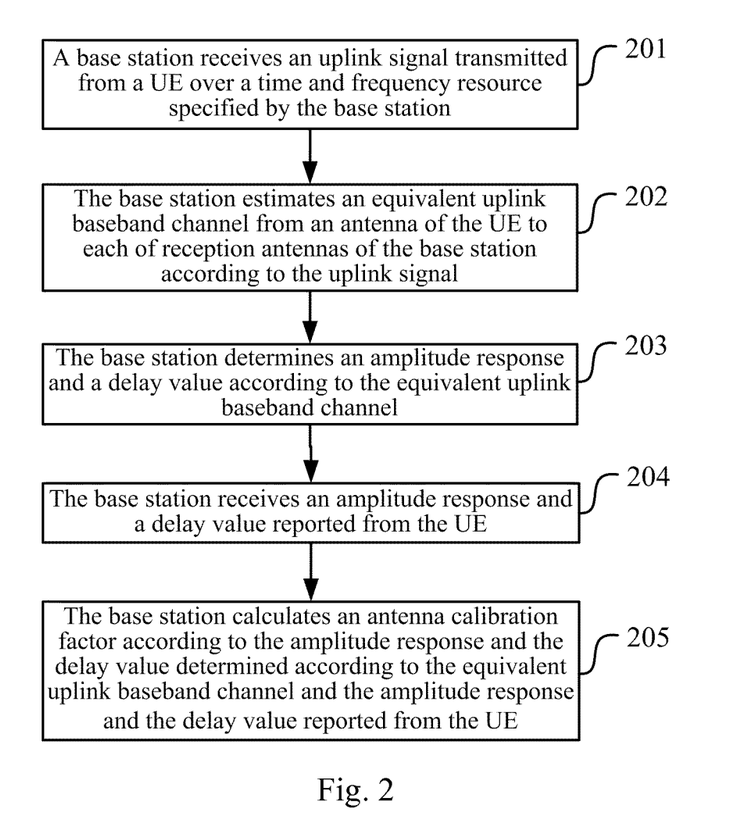
FIG. 2 is a schematic flow chart of a method for determining an antenna calibration factor in an embodiment of the invention.

FIG. 2 is a schematic flow chart of a method for determining an antenna calibration factor, and as illustrated in FIG. 2, a determining process can include the following steps.

Step 201. A base station receives an uplink signal transmitted from a UE over a time and frequency resource specified by the base station.

Step 202. The base station estimates an equivalent uplink baseband channel from an antenna of the UE to each of reception antennas of the base station according to the uplink signal.

Step 203. The base station determines an amplitude response $\lambda_k$ and a delay value $\Pi_k$ according to the equivalent uplink baseband channel.

Step 204. The base station receives $\rho_k$ and $\Delta_k$ reported from the UE.

Step 205. The base station calculates an antenna calibration factor according to $\lambda_k$ and $\Pi_k$, and $\rho_k$ and $\Delta_k$.

In an implementation, reference can be made to the foregoing implementations for $\rho_k$ and $\Delta_k$ received in the step 204, and the step 204 may not necessarily be performed in a required sequential order relative to the steps 201, 202 and 203 as long as $\lambda_k$ and $\Pi_k$, and $\rho_k$ and $\Delta_k$ are available when the step 205 is performed. The step 204 can be scheduled as required in a specific implementation.

In an implementation, the UE transmits an uplink signal, e.g., an uplink sounding reference signal or another pilot signal, over the time and frequency resource specified by the base station in the step 201.

In an implementation, before the base station receives an uplink signal transmitted from the UE over a time and frequency resource specified by the base station, the process can further include:

the base station instructs a UE with a good channel quality (e.g., a signal quality above a signal threshold) and/or at a low movement speed (e.g., a movement speed below a movement threshold) to transmit an uplink signal over a time and frequency resource specified by the base station.

The base station can estimate an equivalent uplink baseband channel from an antenna of the UE to each of reception antennas of the base station according to the uplink signal in the step 202 as follows:

the base station estimates an equivalent uplink baseband channel from the antenna of the UE to each of reception antennas of the base station, which includes a response of a transmission circuit of the UE, a spatially propagating channel and a response of a reception circuit of the base station, according to the uplink signal transmitted from the UE and a received signal; and the base station determines $H_k^{UL}(f_i) = \beta_k(f_i) H_k(f_i) e^{-j2\pi\Pi_k f_i}$, where $H_k^{UL}(f_i)$ is an equivalent uplink baseband channel from the UE to the $k^{th}$ reception antenna of the base station at the $i^{th}$ frequency, $H_k(f_i)$ synthesis channel including the response of the transmission circuit of the antenna of the UE and the spatially propagating channel, $\beta_k(f_i)$ is an amplitude response of the reception circuit of the $k^{th}$ reception antenna of the base station, and $e^{-j2\pi\Pi_k f_i}$ is a phase response of the reception circuit of the $k^{th}$ reception antenna of the base station. In a specific implementation, $H_k(f_i)$ here may be different from $H_k(f_i)$ in the step 102.

The base station can determine $\Pi_k$ according to the equivalent uplink baseband channel in the step 203 as follows:

the base station calculates $\Pi_k$ according to $H_k^{UL}(f_i)$ as follows:

phases of $H_k^{UL}(f_i)$ of the N frequencies are linearly fitted, and the slope of a straight line resulting from fitting is taken as an estimation value of $\Pi_k$:

$\Theta_k(f_i) = \phi_{h,k}(f_i) + 2\pi\Pi_k f_i$ with $i = 1, 2, \ldots N$, where $\phi_{h,k}(f_i)$ is a phase of $H_k(f_i)$, $\Theta_k(f_i)$ is a phase of $H_k^{UL}(f_i)$, $H_k^{UL}(f_i)$ is an equivalent uplink baseband channel from the UE to the $k^{th}$ reception antenna of the base station at the $i^{th}$ frequency, and $H_k(f_i)$ is a synthesis channel including the response of the transmission circuit of the antenna of the UE and the spatially propagating channel; or phases of $$\frac{H_k^{UL}(f_i)}{H_1^{UL}(f_i)}$$

of the N frequencies are linearly fitted taking the first antenna as a reference point, and the slope of a straight line resulting from fitting divided by $2\pi$ is taken as $\Pi_k - \Pi_1$, and then $\Pi_k - \Pi_1$ is taken as $\Pi_k$:

$\Theta_k(f_i) - \Theta_1(f_i) = \phi_{h,k}(f_i) - \phi_{h,1}(f_i) + 2\pi(\Pi_k - \Pi_1)f_i$, with $i = 1, 2, \ldots N$, where $\phi_{h,k}(f_i)$ is a phase of $H_k(f_i)$, $\Theta_k(f_i)$ is a phase of $H_k^{UL}(f_i)$, $H_k^{UL}(f_i)$ is an equivalent uplink baseband channel from the UE to the $k^{th}$ reception antenna of) the base station at the $i^{th}$ frequency, and $H_k(f_i)$ is a synthesis channel including the response of the transmission circuit of the antenna of the UE and the spatially propagating channel.

The base station can determine an amplitude response $\lambda_k$ according to the equivalent baseband channel in the step 203 as follows:

the base station calculates $\lambda_k$ according to $H_k^{UL}(f_i)$ as:

$$\lambda_k = \frac{1}{N} \sum_{i=1}^{N} |H_k^{UL}(f_i)|,$$

where $H_k^{UL}(f_i)$ is an equivalent uplink baseband channel from the antenna of the UE to the $k^{th}$ reception antenna of the base station at the $i^{th}$ frequency, or $$\lambda_k = \sqrt{\frac{1}{N}\sum_{i=1}^{N}|H_k^{UL}(f_i)|^2},$$

where $H_k^{UL}(f_i)$ is an equivalent uplink baseband channel from the antenna of the UE to the $k^{th}$ reception antenna of the base station at the $i^{th}$ frequency; or
an amplitude value of the $k^{th}$ antenna relative to the first antenna is calculated as $\lambda'_k = \lambda_k/\lambda_1$ taking the first antenna as a reference antenna, where $\lambda_k$ is calculated as $$\lambda_k = \frac{1}{N}\sum_{i=1}^{N}|H_k^{UL}(f_i)| \text{ or } \lambda_k = \sqrt{\frac{1}{N}\sum_{i=1}^{N}|H_k^{UL}(f_i)|^2},$$

and where $H_k^{UL}(f_i)$ is an equivalent uplink baseband channel from the antenna of the UE to the $k^{th}$ reception antenna of the base station at the $i^{th}$ frequency, and then derived $\Delta'_k$ is taken as $\lambda_k$.

Specifically, $\lambda_k$ is calculated according to $H_k^{UL}(f_i)$ as:

$$\lambda_k = \frac{1}{N}\sum_{i=1}^{N}|H_k^{UL}(f_i)| \approx \beta_k(f_1)\frac{1}{N}\sum_{i=1}^{N}|H_k(f_i)|,$$

where $\beta_k(f_N)$ is an amplitude response of the reception circuit of the antenna of the base station; or
an amplitude value of the $k^{th}$ antenna relative to the first antenna is calculated as $\lambda'_k = \lambda_k/\lambda_1$ taking the first antenna as a reference antenna, where $\lambda_k$ is calculated as:

$$\lambda_k = \sqrt{\frac{1}{N}\sum_{i=1}^{N}|H_k^{UL}(f_i)|^2} \approx \beta_k(f_1)\sqrt{\frac{1}{N}\sum_{i=1}^{N}|H_k(f_i)|^2},$$

where $\beta_k(f_N)$ is an amplitude response of the reception circuit of the antenna of the base station.

When the base station calculates $\Pi_k$ or $\Pi_k - \Pi_1$, and $\lambda_k$ or $\lambda'_k = \lambda_k/\lambda_1$, reference can be made to the implementations for the UE to calculate $\rho_k$ and $\Delta_k - \Delta_1$, and the base station and the UE can calculate $\lambda_k$ and $\Pi_k - \Pi_1$, and $\rho_k$ and $\Delta_k - \Delta_1$ in the same way.

In an implementation, the base station can calculate an antenna calibration factor according to $\lambda_k$ and $\Pi_k - \Pi_1$, and $\rho_k$ and $\Delta_k - \Delta_1$ in the step 205 as follows: with $e^{-j2\pi\Pi_k f_i}$ being a phase response of the reception circuit of the $k^{th}$ reception antenna of the base station, the base station calculates a calibration factor as:

$c_k(f_i) = e^{j2\pi(\Delta_k - \Delta_1)f_i}e^{-j2\pi(\Pi_k - \Pi_1)f_i}\rho_k/\lambda_k$; or (1)

$c_k(f_i) = e^{j2\pi(\Delta_k - \Delta_1)f_i}e^{-j2\pi(\Pi_k - \Pi_1)f_i}$; or (2)

$c_k(f_i) = \rho_k/\lambda_k$; or (3)

$c_k(f_i) = e^{j2\pi(\Delta_k)f_i}e^{-j2\pi(\Pi_k)f_i}\rho_k/\lambda_k$; or (4)

$c_k(f_i) = e^{j2\pi(\Delta_k - \Delta_1)f_i}e^{-j2\pi(\Pi_k - \Pi_1)f_i}\rho'_k/\lambda'_k$; or (5)

$c_k(f_i) = e^{j2\pi(\Delta_k - \Delta_1)f_i}e^{-j2\pi(\Pi_k - \Pi_1)f_i}\rho'_k/\lambda'_k$; or (6)

$c_k(f_i) = \rho'_k/\lambda'_k$; or (7)

$c_k(f_i) = e^{j2\pi(\Delta_k)f_i}e^{-j2\pi(\Pi_k)f_i}\rho'_k/\lambda'_k$; or (8)

$c_k(f_i) = e^{-j2\pi(\Delta_k)f_i}\rho_k$; or (9)

$c_k(f_i) = e^{-j2\pi(\Delta_k)f_i}$; or (10)

$c_k(f_i) = \rho_k$; or (11)

$c_k(f_i) = e^{-j2\pi(\Delta_k - \Delta_1)f_i}\rho_k$; or (12)

$c_k(f_i) = e^{-j2\pi(\Delta_k - \Delta_1)f_i}$; or (13)

$c_k(f_i) = e^{-j2\pi(\Delta_k - \Delta_1)f_i}\rho'_k$; or (14)

$c_k(f_i) = \rho'_k$; or (15)

$c_k(f_i) = e^{-j2\pi(\Delta_k)f_i}\rho'_k$; or (16)

$c_k(f_i) = e^{j2\pi(\Pi_k - \Pi_1)f_i}/\lambda_k$; or (17)

$c_k(f_i) = e^{j2\pi(\Pi_k - \Pi_1)f_i}$; or (18)

$c_k(f_i) = 1/\lambda_k$; or (19)

$c_k(f_i) = e^{j2\pi(\Pi_k)f_i}/\lambda_k$; or (20)

$c_k(f_i) = e^{j2\pi(\Pi_k)f_i}$; or (21)

$c_k(f_i) = e^{j2\pi(\Pi_k - \Pi_1)f_i}/\lambda'_k$; or (22)

$c_k(f_i) = 1/\lambda'_k$; or (23)

$c_k(f_i) = e^{j2\pi(\Pi_k)f_i}/\lambda'_k$. (24)

Specifically, the base station calculates calibration factors and also multiplies the calibration factors of all the antennas by a scalar and obtains a new set of calibration factors without any influence on performance.

In an implementation, the process can further include after the step 205:
the base station calibrates by the calibration factor in the following equation the channel estimated according to an uplink pilot signal to obtain an estimation value of a downlink channel:

$\hat{H}_k^{DL}(f_i) = H_k^{UL}(f_i)c_k(f_i)$, where $i = 1, 2, \ldots N$; and/or pre-processes a signal to be transmitted in the downlink:
$\overline{Y}_k(f_i) = Y_k(f_i)/c_k(f_i)$, where $Y_k(f_i)$ is a data signal and/or a pilot signal to be transmitted over the $k^{th}$ antenna of the base station, and $\overline{Y}_k(f_i)$ is the pre-processed signal.

Particularly, the two alternatives can also be combined dependent upon a differently calculated calibration factor, that is, the channel is adjusted by the calibration factor in Equations 17) to 24), and the signal to be transmitted is adjusted by the calibration factor in Equations 9) to 16).

Specifically, the base station can save the calculated calibration factor and thereafter calibrate by the saved calibration factor a channel estimated according to an uplink pilot signal to obtain a downlink channel.

In the foregoing implementations, a calibration process is assumed involving one antenna of one UE to thereby obtain a set of calibration factors. In fact, calibration can involve a plurality of antennas of a plurality of UEs, and a set of calibration factors can be obtained for each of the antennas. These sets of calibration factors can be further processed, for example, through linear averaging, to obtain a general calibration factor. It shall be noted that the respective sets of calibration factors can be normalized as $c'_k(f_i)=c_k(f_i)/c_1(f_i)$ prior to linear averaging or the like.

Also in the foregoing implementations, the antennas to be calibrated can be antennas in the same cell or antennas in different cells.

A number M of antennas of the base station can be antennas located at the same geographical location or antennas separate in geographical location or antennas controlled respectively by a plurality of base stations.

Based upon the same inventive idea, there are further provided in embodiments of the invention a base station and a user equipment, and since these devices address the problem under a similar principle to the method for reporting antenna calibration information and the method for determining an antenna calibration factor, reference can be made to the implementations of the methods for implementations of the devices, a repeated description of which will be omitted here.

Figure 3:
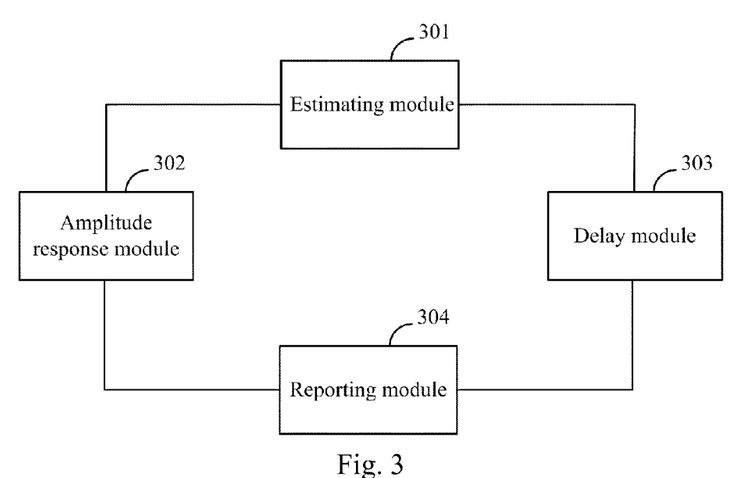
FIG. 3 is a schematic structural diagram of a user equipment in an embodiment of the invention.

FIG. 3 is a schematic structural diagram of a user equipment, and as illustrated in FIG. 3, the UE can include:

an estimating module 301 configured to estimate an equivalent downlink baseband channel from each of a plurality of antennas of a base station to the UE;

an amplitude response module 302 configured to determine an amplitude response $\rho_k$ to be reported according to the equivalent downlink baseband channel;

a delay module 303 configured to determine a delay value $\Delta_k$ to be reported according to the equivalent downlink baseband channel; and a reporting module 304 configured to report $\rho_k$ and $\Delta_k$ to the base station.

In an implementation, the estimating module 301 can include:

a measuring unit configured to measure an equivalent downlink baseband channel from a transmission antenna at each of a number N of frequencies f in a frequency band specified by the base station to the UE, which includes a response of a transmission circuit, a spatially propagating channel and a response of a reception circuit; and a determining unit configured to determine $$H_k^{DL}(f_i)=\alpha_k(f_i)H_k(f_i)e^{-j2\pi\Delta_k f_i},$$

where $H_k^{DL}(f_i)$ is an equivalent downlink baseband channel from the $k^{th}$ transmission antenna at the $i^{th}$ frequency to the UE, $H_k(f_i)$ is a synthesis channel including the response of the reception circuit of an antenna of the UE and the spatially propagating channel, $\alpha_k(f_i)$ is an amplitude response of the transmission circuit of the base station, and $e^{-j2\pi\Delta_k f_i}$ is a phase response of the transmission circuit of the base station.

In an implementation, the measuring unit can further be configured in an LTE system to determine the frequency band specified by the base station as several consecutive PRBs among which the frequencies f are sub-carriers.

In an implementation, the delay module 303 can include a first determining unit and/or a second determining unit, where:

the first determining unit is configured for the UE to measure an equivalent downlink baseband channel from a transmission antenna at each of a number N of frequencies f in a frequency band specified by the base station to an antenna of the UE, and calculate $\Delta_k$ according to $H_k^{DL}(f_i)$ as follows:

phases of $H_k^{DL}(f_i)$ of the N frequencies are linearly fitted, and the slope of a straight line resulting from fitting divided by $2\pi$ is taken as an estimation value of $\Delta_k$: $\Theta_k(f_i)=\phi_{h,k}(f_i)+2\pi\Delta_k f_i$ with $i=1,2,\ldots N$, where $\phi_{h,k}(f_i)$ is a phase of $H_k(f_i)$, $\Theta_k(f_i)$ is a phase of $H_k^{DL}(f_i)$, $H_k^{DL}(f_i)$ is an equivalent downlink baseband channel from the $k^{th}$ transmission antenna at the $i^{th}$ frequency to the UE, and $H_k(f_i)$ is a synthesis channel including the response of the reception circuit of the antenna of the UE and the spatially propagating channel; and the second determining unit is configured for the UE to measure an equivalent downlink baseband channel from a transmission antenna at each of a number N of frequencies f in a frequency band specified by the base station to an antenna of the UE, linearly fit phases of $$\frac{H_k^{DL}(f_i)}{H_1^{DL}(f_i)}$$

of the N frequencies taking the first antenna as a reference point, and take the slope of a straight line resulting from fitting divided by $2\pi$ as $\Delta k-\Delta 1$, and then take $\Delta_k-\Delta_1$ as $\Delta_k$:

$\Theta_k(f_i)-\Theta_1(f_i)=\phi_{h,k}(f_i)-\phi_{h,1}(f_i)+2\pi(\Delta_k-\Delta_1(f_i)$ with $i=1,2,\ldots N$, where $\phi_{h,k}(f_i)$ is a phase of $H_k(f_i)$, $\Theta_k(f_i)$ is a phase of $H_k^{DL}(f_i)$, $H_k^{DL}(f_i)$ is an equivalent downlink baseband channel from the $k^{th}$ transmission antenna at the $i^{th}$ frequency to the UE, and $H_k(f_i)$ is a synthesis channel including the response of the reception circuit of the antenna of the UE and the spatially propagating channel.

In an implementation, the amplitude response module 302 can include a third determining unit and/or a fourth determining unit, where:

the third determining unit is configured for the UE to measure an equivalent downlink baseband channel from a transmission antenna at each of a number N of frequencies f in a frequency band specified by the base station to an antenna of the UE, and calculate $\rho_k$ according to $H_k^{DL}(f_i)$ as:

$$\rho_k = \frac{1}{N}\sum_{i=1}^{N}|H_k^{DL}(f_i)| \text{ or } \rho_k = \sqrt{\frac{1}{N}\sum_{i=1}^{N}|H_k^{DL}(f_i)|^2},$$

where $H_k^{DL}(f_i)$ is an equivalent baseband channel from the $k^{th}$ transmission antenna at the $i^{th}$ frequency to the UE; and the fourth determining unit is configured for the UE to measure an equivalent downlink baseband channel from a transmission antenna at each of a number N of frequencies f in a frequency band specified by the base station to an antenna of the UE, and calculate an amplitude value of the $k^{th}$ antenna relative to the first antenna as $\rho'_k=\rho_k/\rho_1$ taking the first antenna as a reference antenna, where $$\rho_k = \frac{1}{N}\sum_{i=1}^{N}|H_k^{DL}(f_i)| \text{ or } \rho_k = \sqrt{\frac{1}{N}\sum_{i=1}^{N}|H_k^{DL}(f_i)|^2},$$

and $H_k^{DL}(f_i)$ is an equivalent baseband channel from the $k^{th}$ transmission antenna at the $i^{th}$ frequency to the UE, and then take derived $\rho'_k$ as $\rho_k$.

In an implementation, the estimating module 301 can be further configured to estimate an equivalent downlink baseband channel from each of the plurality of antennas of the base station to an antenna of the UE upon obtaining an instruction of the base station.

A number M of antennas of the base station can be antennas located at the same geographical location or antennas separate in geographical location or antennas controlled respectively by a plurality of base stations.

Figure 4:
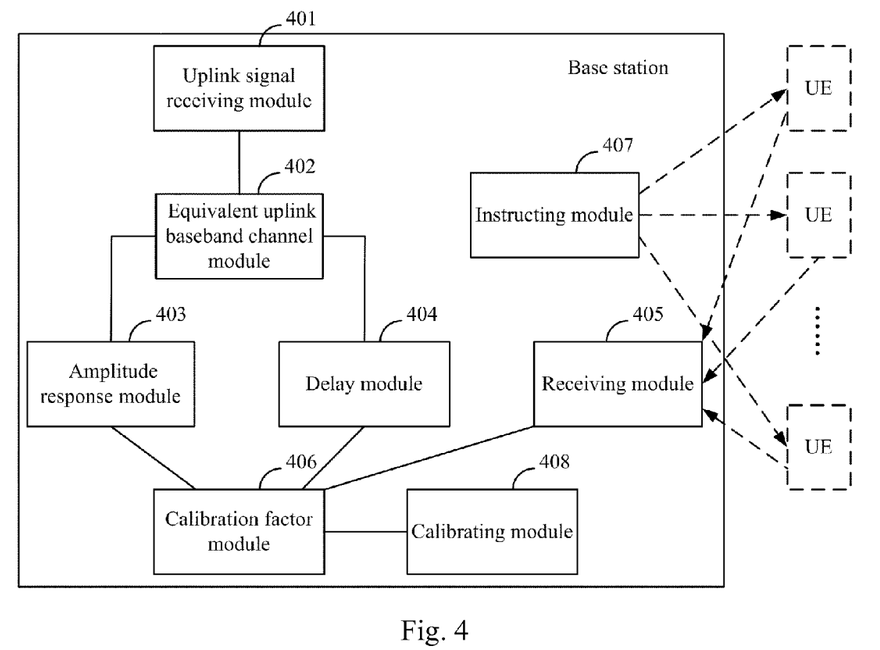
FIG. 4 is a schematic structural diagram of a base station in an embodiment of the invention.

FIG. 4 is a schematic structural diagram of a base station, and as illustrated in FIG. 4, the base station can include:

an uplink signal receiving module 401 configured to receive an uplink signal transmitted from a UE over a time and frequency resource specified by the base station;

an equivalent uplink baseband channel module 402 configured to estimate an equivalent uplink baseband channel from an antenna of the UE to each of reception antennas of the base station according to the uplink signal;

an amplitude response module 403 configured to determine an amplitude response $\lambda_k$ according to the equivalent uplink baseband channel;

a delay module 404 configured to determine a delay value $\Pi_k$ according to the equivalent uplink baseband channel;

a receiving module 405 configured to receive $\rho_k$ and $\Delta_k$ reported from the UE, reference can be made to the foregoing embodiments for reception of $\rho_k$ and $\Delta_k$ in an implementation; and a calibration factor module 406 configured to calculate an antenna calibration factor according to $\lambda_k$ and $\Pi_k$, and $\rho_k$ and $\Delta_k$.

In an implementation, the equivalent uplink baseband channel module 402 can include:

an estimating unit configured to estimate an equivalent uplink baseband channel from the antenna of the UE to each of the reception antennas of the base station, which includes a response of a transmission circuit of the UE, a spatially propagating channel and a response of a reception circuit of the base station, according to the uplink signal transmitted from the UE and a received signal; and a determining unit configured to determine $$H_k^{UL}(f_i) = \beta_k(f_i) H_k(f_i) e^{-j2\pi \Pi_k f_i},$$

where $H_k^{UL}(f_i)$ is an equivalent uplink baseband channel from the UE to the $k^{th}$ reception antenna of the base station at the $i^{th}$ frequency, $H_k(f_i)$ is a synthesis channel including the response of the transmission circuit of the antenna of the UE and the spatially propagating channel, $\beta_k(f_i)$ is an amplitude response of the reception circuit of the base station, and $e^{-j2\pi \Pi_k f_i}$ is a phase response of the reception circuit of the base station.

In an implementation, the delay module 404 can include a first determining unit and/or a second determining unit, where:

the first determining unit is configured to calculate $\Pi_k$ according to $H_k^{UL}(f_i)$ as follows:

phases of $H_k^{UL}(f_i)$ of a number N of frequencies are linearly fitted, and the slope of a straight line resulting from fitting is taken as an estimation value of $\Pi_k$: $\Theta_k(f_i) = \phi_{h,k}(f_i) + 2\pi \Pi_k f_i$, with i=1, 2, ... N, where $\phi_{h,k}(f_i)$ is a phase of $H_k(f_i)$, $\Theta_k(f_i)$ is a phase of $H_k^{UL}(f_i)$, $H_k^{UL}(f_i)$ is an equivalent uplink baseband channel from the UE to the $k^{th}$ reception antenna of the base station at the $i^{th}$ frequency, and $H_k(f_i)$ is a synthesis channel including the response of the transmission circuit of the antenna of the UE and the spatially propagating channel; and the second determining unit is configured to linearly fit phases $$\frac{H_k^{UL}(f_i)}{H_1^{UL}(f_i)}$$

of a number N of frequencies taking the first antenna as a reference point, and take the slope of a straight line resulting from fitting divided by $2\pi$ as $\Pi_k - \Pi_1$, and then take $\Pi_k - \Pi_1$ as $\Pi_k$:

$$\Theta_k(f_i) - \Theta_1(f_i) = \phi_{h,k}(f_i) - \phi_{h,1}(f_i) + 2\pi(\Pi_k - \Pi_1) f_i,$$

with i=1, 2, ... N, where $\phi_{h,k}(f_i)$ is a phase of $H_k(f_i)$, $\Theta_k(f_i)$ is a phase of $H_k^{UL}(f_i)$, $H_k^{UL}(f_i)$ is an equivalent uplink baseband channel from the UE to the $k^{th}$ reception antenna of the base station at the $i^{th}$ frequency, and $H_k(f_i)$ is a synthesis channel including the response of the transmission circuit of the antenna of the UE and the spatially propagating channel.

In an implementation, the amplitude response module 403 can include a third determining unit and/or a fourth determining unit, where:

the third determining unit is configured to calculate $\lambda_k$ according to $H_k^{UL}(f_i)$ as:

$$\lambda_k = \frac{1}{N}\sum_{i=1}^{N} |H_k^{UL}(f_i)| \text{ or } \lambda_k = \sqrt{\frac{1}{N}\sum_{i=1}^{N} |H_k^{UL}(f_i)|^2},$$

where $H_k^{UL}(f_i)$ is an equivalent baseband channel from the UE to the $k^{th}$ reception antenna of the base station at the $i^{th}$ frequency; and the fourth determining unit is configured to calculate an amplitude value of the $k^{th}$ antenna relative to the first antenna as $\lambda'_k = \lambda_k / \lambda_1$ taking the first antenna as a reference antenna, where $\lambda_k$ is calculated as:

$$\lambda_k = \frac{1}{N}\sum_{i=1}^{N} |H_k^{UL}(f_i)|$$

or $$\lambda_k = \sqrt{\frac{1}{N}\sum_{i=1}^{N} |H_k^{UL}(f_i)|^2},$$

where $H_k^{UL}(f_i)$ is an equivalent baseband channel from the UE to the $k^{th}$ reception antenna of the base station at the $i^{th}$ frequency, and then take derived $\lambda'_k$ as $\lambda_k$.

In an implementation, the base station can further include:

an instructing module 407 configured to instruct a UE with a good channel quality and/or at a low movement speed to transmit the uplink signal over the time and frequency resource specified by the base station.

In an implementation, the calibration factor module 406 can be further configured to calculate the antenna calibration factor according to $\lambda_k$ and $\Pi_k$, and $\rho_k$ and $\Delta_k$ by calculating the antenna calibration factor as:

$c_k(f_i) = e^{-j2\pi(\Delta_k)f_i} e^{j2\pi(\Pi_k)f_i} \rho_k / \lambda_k$; or $c_k(f_i) = e^{-j2\pi(\Delta_k)f_i} e^{j2\pi(\Pi_k)f_i}$; or $c_k(f_i) = \rho_k / \lambda_k$; or $c_k(f_i) = e^{-j2\pi(\Delta_k)f_i} \rho_k$; or $c_k(f_i) = \rho_k$; or $c_k(f_i) = e^{-j2\pi(\Delta_k)f_i}$; or $c_k(f_i) = e^{j2\pi(\Pi_k)f_i}$; or $c_k(f_i) = 1/\lambda_k$ with $e^{-j2\pi\Pi_k f_i}$ being a phase response of a reception circuit of the base station.

In an implementation, the base station can further include:

a calibrating module 408 configured to calibrate by the calibration factor in the following equation the channel estimated according to an uplink pilot signal to obtain an estimation value of a downlink channel:

$$\hat{H}_k^{DL}(f_i) = H_k^{UL}(f_i) c_k(f_i); \text{ and/or}$$

to pre-process a signal to be transmitted in the downlink: $\overline{Y}_k(f_i) = Y_k(f_i)/c_k(f_i)$, where $Y_k(f)$ is a data signal and/or a pilot signal to be transmitted over the $k^{th}$ antenna of the base station, and $\overline{Y}_k(f_i)$ is the pre-processed signal.

For the convenience of a description, the respective components of the foregoing devices have been described respectively by functionally dividing them into respective modules or units. Of course, the functions of the respective modules or units can be performed in the same one or a plurality of items of software or hardware to put the invention into practice.

As can be apparent from the foregoing embodiments, amplitude information and phase information (a delay) are separated out from downlink channel information estimated by the UE and fed back, and the base station uses the information for calibration in the technical solution according to the invention.

Specifically, an antenna calibration process includes:

a UE estimates an equivalent downlink baseband channel from each of a plurality of antennas of a base station to an antenna of the UE;

the UE calculates $\rho_k$ and a delay value $\Delta_k - \Delta_1$ according to the equivalent baseband channel;

the UE feeds back quantized $\rho_k$ and $\Delta_k - \Delta_1$;

the UE transmits an uplink SRS signal, and the base station estimates $\lambda_k$ and $\Pi_k - \Pi_1$ according to the SRS signal; and the base station calculates a calibration factor.

A number M of antennas of the base station can be antennas located at the same geographical location or antennas separate in geographical location or antennas controlled respectively by a plurality of base stations.

In the technical solution according to the invention, amplitude information and phase information are separated out from channel information and fed back, and the base station uses the information for calibration, thereby calibrating amplitude and phase concurrently. The technical solution according to the invention can become less sensitive to a channel estimation error and channel Doppler spreading due to additional pre-processing by the UE.

Those skilled in the art shall appreciate that the embodiments of the invention can be embodied as a method, a system or a computer program product. Therefore, the invention can be embodied in the form of an all-hardware embodiment, an all-software embodiment or an embodiment of software and hardware in combination. Furthermore, the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable data processing device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore, the appended claims are intended to be construed as encompassing the preferred embodiments and all the modifications and variations coming into the scope of the invention.

Evidently, those skilled in the art can make various modifications and variations to the invention without departing from the scope of the invention. Thus the invention is also intended to encompass these modifications and variations thereto so long as the modifications and variations come into the scope of the claims appended to the invention and their equivalents.

The invention claimed is:

1. A method for reporting antenna calibration information, comprising:

estimating, by a User Equipment, UE, an equivalent downlink baseband channel from each of a plurality of antennas of a base station to an antenna of the UE;

determining, by the UE, an amplitude response $\rho_k$ and a delay value $\Delta_k$ to be reported according to the equivalent downlink baseband channel; and reporting, by the UE, $\rho_k$ and $\Delta_k$ to the base station;

wherein determining, by the UE, $\Delta_k$ according to the equivalent downlink baseband channel comprises:

measuring, by the UE, an equivalent downlink baseband channel from a transmission antenna at each of a number N of frequencies f in a frequency band specified by the base station to the antenna of the UE, and calculating $\Delta_k$ according to $H_k^{DL}(f_i)$ by:

linearly fitting phases of $H_k^{DL}(f_i)$ of the N frequencies, and taking the slope of a straight line resulting from the fitting divided by $2\pi$ as an estimation value of $\Delta_k$; or measuring, by the UE, an equivalent downlink baseband channel from a transmission antenna at each of a number N of frequencies f in a frequency band specified by the base station to the antenna of the UE, linearly fitting phases of $$\frac{H_k^{DL}(f_i)}{H_1^{DL}(f_i)}$$

of the N frequencies taking the first antenna as a reference point, and taking the slope of a straight line resulting from the fitting divided by $2\pi$ as $\Delta_k-\Delta_1$, and then taking $\Delta_k-\Delta_1$ as $\Delta_k$; and wherein $H_k^{DL}(f_i)$ is an equivalent downlink baseband channel from the $k^{th}$ transmission antenna at the $i^{th}$ frequency to the antenna of the UE.

2. The method according to claim 1, wherein determining, by the UE, $\rho_k$ according to the equivalent downlink baseband channel comprises:

measuring, by the UE, an equivalent downlink baseband channel from a transmission antenna at each of a number N of frequencies f in a frequency band specified by the base station to the antenna of the UE, and calculating, by the UE, $\rho_k$ according to $H_k^{DL}(f_i)$ as:

$$\rho_k = \frac{1}{N}\sum_{i=1}^{N} |H_k^{DL}(f_i)|,$$

wherein $H_k^{DL}(f_i)$ is an equivalent downlink baseband channel from the $k^{th}$ transmission antenna at the $i^{th}$ frequency to the antenna of the UE, or $$\rho_k = \sqrt{\frac{1}{N}\sum_{i=1}^{N} |H_k^{DL}(f_i)|^2},$$

wherein $H_k^{DL}(f_i)$ is an equivalent downlink baseband channel from the $k^{th}$ transmission antenna at the $i^{th}$ frequency to the antenna of the UE; or measuring, by the UE, an equivalent downlink baseband channel from a transmission antenna at each of a number N of frequencies f in a frequency band specified by the base station to the UE, and calculating an amplitude value of the $k^{th}$ antenna relative to the first antenna as $\rho'_k=\rho_k/\rho_1$ taking the first antenna as a reference antenna, wherein $$\rho_k = \frac{1}{N}\sum_{i=1}^{N} |H_k^{DL}(f_i)|$$

or $$\rho_k = \sqrt{\frac{1}{N}\sum_{i=1}^{N} |H_k^{DL}(f_i)|^2},$$

and $H_k^{DL}(f_i)$ is an equivalent downlink baseband channel from the $k^{th}$ transmission antenna at the $i^{th}$ frequency to the antenna of the UE, and then taking the derived $\rho'_k$ as $\rho_k$.

3. The method according to claim 1, wherein before the UE estimates an equivalent downlink baseband channel from each of the plurality of antennas of the base station to the UE, the method further comprises:

receiving, by the UE, an instruction of the base station.

4. A base station, comprising:

an uplink signal receiving module configured to receive an uplink signal transmitted from a UE over a time and frequency resource specified by the base station;

an equivalent uplink baseband channel module configured to estimate an equivalent uplink baseband channel from an antenna of the UE to each of reception antennas of the base station according to the uplink signal;

an amplitude response module configured to determine an amplitude response $\lambda_k$ according to the equivalent uplink baseband channel;

a delay module configured to determine a delay value $\Pi_k$ according to the equivalent uplink baseband channel;

a receiving module configured to receive $\rho_k$ and $\Delta_k$ reported from the UE according to claim 1; and a calibration factor module configured to calculate an antenna calibration factor according to $\lambda_k$ and $\Pi_k$, and $\rho_k$ and $\Delta_k$.

5. The base station according to claim 4, wherein the delay module comprises a first determining unit and/or a second determining unit, wherein:

the first determining unit is configured to calculate $\Pi_k$ according to $H_k^{UL}(f_i)$ by:

linearly fitting phases of $H_k^{UL}(f_i)$ of a number of N frequencies, and taking the slope of a straight line resulting from the fitting as an estimation value of $\Pi_k$; and the second determining unit is configured to linearly fit phases of $$\frac{H_k^{UL}(f_i)}{H_1^{UL}(f_i)}$$

of a number N of frequencies taking the first antenna as a reference point, and take the slope of a straight line resulting from the fitting divided by $2\pi$ as $\Pi_k-\Pi_1$, and then take $\Pi_k-\Pi_1$ as $\Pi_k$; and wherein $H_k^{UL}(f_i)$ is an equivalent uplink baseband channel from the antenna of the UE to the $k^{th}$ reception antenna of the base station at the $i^{th}$ frequency.

6. The base station according to claim 4, wherein the amplitude response module comprises a third determining unit and/or a fourth determining unit, wherein:

the third determining unit is configured to calculate $\lambda_k$ according to $H_k^{UL}(f_i)$ as:

$$\lambda_k = \frac{1}{N}\sum_{i=1}^{N} |H_k^{UL}(f_i)|$$

or $$\lambda_k = \sqrt{\frac{1}{N}\sum_{i=1}^{N} |H_k^{UL}(f_i)|^2}$$

wherein $H_k^{UL}(f_i)$ is an equivalent baseband channel from the antenna of the UE to the $k^{th}$ reception antenna of the base station at the $i^{th}$ frequency; and the fourth determining unit is configured to calculate an amplitude value of the $k^{th}$ antenna relative to the first antenna as $\lambda'_k=\lambda_k/\lambda^1$ taking the first antenna as a reference antenna, wherein $\lambda_k$ is calculated as:

$$\lambda_k = \frac{1}{N}\sum_{i=1}^{N}|H_k^{UL}(f_i)|$$

or $$\lambda_k = \sqrt{\frac{1}{N}\sum_{i=1}^{N}|H_k^{UL}(f_i)|^2},$$

wherein $H_k^{UL}(f_i)$ is an equivalent baseband channel from the antenna of the UE to the $k^{th}$ reception antenna of the base station at the $i^{th}$ frequency, and then take the derived $\lambda'_k$ as $\lambda_k$.

7. The base station according to claim 4, further comprising:
an instructing module configured to instruct the UE with a signal quality above a signal threshold and/or at a movement speed below a movement threshold to transmit the uplink signal over the time and frequency resource specified by the base station.

8. The base station according to claim 4, wherein the calibration factor module is further configured to calculate the antenna calibration factor according to $\lambda_k$ and $\Pi_k$, and $\rho_k$ and $\Delta_k$ by calculating the antenna calibration factor as:

$c_k(f_i)=e^{-j2\pi(\Delta_k)f_i}e^{j2\pi(\Pi_k)f_i}\rho_k/\lambda_k$; or $c_k(f_i)=e^{-j2\pi(\Delta_k)f_i}e^{j2\pi(\Pi_k)f_i}$; or $c_k(f_i)=\rho_k/\lambda_k$; or $c_k(f_i)=e^{-j2\pi(\Delta_k)f_i}\rho_k$; or $c_k(f_i)=\rho_k$; or $c_k(f_i)=e^{-j2\pi(\Delta_k)f_i}$; or $c_k(f_i)=e^{j2\pi(\Pi_k)f_i}/\lambda_k$; or $c_k(f_i)=e^{j2\pi(\Pi_k)f_i}$; or $c_k(f_i)=1/\lambda_k$ with $e^{-j2\pi\Pi_k f_i}$ being a phase response of a reception circuit of the base station.

9. The base station according to claim 8, further comprising:
a calibrating module configured to calibrate by the calibration factor in the following equation the channel estimated according to an uplink pilot signal to obtain an estimation value of a downlink channel:

$\hat{H}_k^{DL}(f_i)=H_k^{UL}(f_i)c_k(f_i)$;

and/or
configured to pre-process a signal to be transmitted in the downlink:
$\overline{Y}_k(f_i)=Y_k(f_i)/c_k(f_i)$, wherein $Y_k(f_i)$ is a data signal and/or a pilot signal to be transmitted over the $k^{th}$ antenna of the base station, and $\overline{Y}_k(f_i)$ is the pre-processed signal.

10. A method for determining an antenna calibration factor, comprising:
receiving, by a base station, an uplink signal transmitted from a UE over a time and frequency resource specified by the base station;
estimating, by the base station, an equivalent uplink baseband channel from an antenna of the UE to each of reception antennas of the base station according to the uplink signal;
determining, by the base station, an amplitude response $\lambda_k$ and a delay value $\Pi_k$ according to the equivalent uplink baseband channel;
receiving, by the base station, $\rho_k$ and $\Delta_k$ reported from the UE according to claim 1; and
calculating, by the base station, an antenna calibration factor according to $\lambda_k$ and $\Pi_k$, and $\rho_k$ and $\Delta_k$.

11. The method according to claim 10, wherein determining, by the base station, $\Pi_k$ according to the equivalent uplink baseband channel comprises;
calculating, by the base station, $\Pi_k$ according to $H_k^{UL}(f_i)$ by:
linearly fitting phases of $H_k^{UL}(f_i)$ of a number of N frequencies, and taking the slope of a straight line resulting from the fitting as an estimation value of $\Pi_k$; or
linearly fitting phases of $$\frac{H_k^{UL}(f_i)}{H_1^{UL}(f_i)}$$

of a number N of frequencies taking the first antenna as a reference point, and taking the slope of a straight line resulting from the fitting divided by $2\pi$ as $\Pi_k-\Pi_1$, and then taking $\Pi_k-\Pi_1$ as $\Pi_k$; and
wherein $H_k^{UL}(f_i)$ is an equivalent uplink baseband channel from the antenna of the UE to the $k^{th}$ reception antenna of the base station at the $i^{th}$ frequency.

12. The method according to claim 10, wherein determining, by the base station, an amplitude response $\lambda_k$ according to the equivalent uplink baseband channel comprises:
calculating, by the base station, $\lambda_k$ according to $H_k^{UL}(f_i)$ as:

$$\lambda_k = \frac{1}{N}\sum_{i=1}^{N}|H_k^{UL}(f_i)|,$$

wherein $H_k^{UL}(f_i)$ is an equivalent uplink baseband channel from the antenna of the UE to the $k^{th}$ reception antenna of the base station at the $i^{th}$ frequency, or $$\lambda_k = \sqrt{\frac{1}{N}\sum_{i=1}^{N}|H_k^{UL}(f_i)|^2},$$

wherein $H_k^{UL}(f_i)$ is an equivalent uplink baseband channel from the antenna of the UE to the $k^{th}$ reception antenna of the base station at the $i^{th}$ frequency; or
calculating an amplitude value of the $k^{th}$ antenna relative to the first antenna as $\lambda'_k=\lambda_k/\lambda_1$ taking the first antenna as a reference antenna, wherein $\lambda_k$ is calculated as:

$$\lambda_k = \frac{1}{N}\sum_{i=1}^{N}|H_k^{UL}(f_i)|$$

or $$\lambda_k = \sqrt{\frac{1}{N}\sum_{i=1}^{N}|H_k^{UL}(f_i)|^2},$$

wherein $H_k^{UL}(f_i)$ is an equivalent uplink baseband channel from the antenna of the UE to the $k^{th}$ reception antenna of the base station at the $i^{th}$ frequency, and then taking the derived $\lambda'_k$ as $\lambda_k$.

13. The method according to claim 10, wherein before the base station receives the uplink signal transmitted from the UE over the time and frequency resource specified by the base station, the method further comprises:
   instructing, by the base station, the UE with a signal quality above a signal threshold and/or at a movement speed below a movement threshold to transmit the uplink signal over the time and frequency resource specified by the base station.

14. The method according to claim 10, wherein the base station calculates the antenna calibration factor according to $\lambda_k$ and $\Pi_k$, and $\rho_k$ and $\Delta_k$ comprises:
   with $e^{-j2\pi\Pi_k f_i}$ being a phase response of a reception circuit of the base station, calculating, by the base station, the antenna calibration factor as:

$c_k(f_i) = e^{-j2\pi(\Delta_k)f_i} e^{j2\pi(\Pi_k)f_i} \rho_k/\lambda_k$; or $c_k(f_i) = e^{-j2\pi(\Delta_k)f_i} e^{j2\pi(\Pi_k)f_i}$; or $c_k(f_i) = \rho_k/\lambda_k$; or $c_k(f_i) = e^{-j2\pi(\Delta_k)f_i} \rho_k$; or $c_k(f_i) = \rho_k$; or $c_k(f_i) = e^{-j2\pi(\Delta_k)f_i}$; or $c_k(f_i) = e^{j2\pi(\Pi_k)f_i}/\lambda_k$; or $c_k(f_i) = e^{j2\pi(\Pi_k)f_i}$; or $c_k(f_i) = 1/\lambda_k$.

15. The method according to claim 14, further comprising:
   calibrating, by the base station, by the calibration factor in the following equation the channel estimated according to an uplink pilot signal to obtain an estimation value of a downlink channel:

$\hat{H}_k^{DL}(f_i) = H_k^{UL}(f_i) c_k(f_i)$;

and/or
   pre-processing a signal to be transmitted in the downlink:
   $\overline{Y}_k(f_i) = Y_k(f_i)/c_k(f_i)$,
   wherein $Y_k(f_i)$ is a data signal and/or a pilot signal to be transmitted over the $k^{th}$ antenna of the base station, and $\overline{Y}_k(f_i)$ is the pre-processed signal.

16. A user equipment, comprising:
   an estimating module configured to estimate an equivalent downlink baseband channel from each of a plurality of antennas of a base station to an antenna of the UE;
   an amplitude response module configured to determine an amplitude response $\rho_k$ to be reported according to the equivalent downlink baseband channel;
   a delay module configured to determine a delay value $\Delta_k$ to be reported according to the equivalent downlink baseband channel; and
   a reporting module configured to report $\rho_k$ and $\Delta_k$ to the base station;
   wherein the delay module comprises a first determining unit and/or a second determining unit, where:
      the first determining unit is configured for the UE to measure an equivalent downlink baseband channel from a transmission antenna at each of a number N of frequencies f in a frequency band specified by the base station to the antenna of the UE, and calculate $\Delta_k$ according to $H_k^{DL}(f_i)$ by:
      linearly fitting phases of $H_k^{DL}(f_i)$ of the N frequencies, and taking the slope of a straight line resulting from the fitting divided by $2\pi$ as an estimation value of $\Delta_k$; and
      the second determining unit is configured for the UE to measure an equivalent downlink baseband channel from a transmission antenna at each of a number N of frequencies f in a frequency band specified by the base station to the antenna of the UE, linearly fit phases of $$\frac{H_k^{DL}(f_i)}{H_1^{DL}(f_i)}$$

of the N frequencies taking the first antenna as a reference point, and take the slope of a straight line resulting from the fitting divided by $2\pi$ as $\Delta_k - \Delta_1$, and then take $\Delta_k - \Delta_1$ as $\Delta_k$; and
   wherein $H_k^{DL}(f_i)$ is an equivalent downlink baseband channel from the $k^{th}$ transmission antenna at the $i^{th}$ frequency to the antenna of the UE.

17. The user equipment according to claim 16, wherein the amplitude response module comprises a third determining unit and/or a fourth determining unit, wherein:
   the third determining unit is configured for the UE to measure an equivalent downlink baseband channel from a transmission antenna at each of a number N of frequencies f in a frequency band specified by the base station to the antenna of the UE, and calculate $\rho_k$ according to $H_k^{DL}(f_i)$ as:

$$\rho_k = \frac{1}{N} \sum_{i=1}^{N} |H_k^{DL}(f_i)|$$

or $$\rho_k = \sqrt{\frac{1}{N} \sum_{i=1}^{N} |H_k^{DL}(f_i)|^2},$$

wherein $H_k^{DL}(f_i)$ is an equivalent downlink baseband channel from the $k^{th}$ transmission antenna at the $i^{th}$ frequency to the antenna of the UE; and
   the fourth determining unit is configured for the UE to measure an equivalent downlink baseband channel from a transmission antenna at each of a number N of frequencies f in a frequency band specified by the base station to the antenna of the UE, and calculate an amplitude value of the $k^{th}$ antenna relative to the first antenna as $\rho'_k = \rho_k/\rho_1$ taking the first antenna as a reference antenna, wherein $$\rho_k = \frac{1}{N} \sum_{i=1}^{N} |H_k^{DL}(f_i)|$$

or $$\rho_k = \sqrt{\frac{1}{N} \sum_{i=1}^{N} |H_k^{DL}(f_i)|^2},$$

and $H_k^{DL}(f_i)$ is an equivalent downlink baseband channel from the $k^{th}$ transmission antenna at the $i^{th}$ frequency to the antenna of the UE, and then take the derived $\rho'_k$ as $\rho_k$.

18. The user equipment according to claim 16, wherein the estimating module is further configured to estimate an equivalent downlink baseband channel from each of the plurality of antennas of the base station to the UE upon obtaining an instruction of the base station.

\* \* \* \* \*